No. 607,991. Patented July 26, 1898.
T. & A. GUTHRIE.
APPARATUS FOR MAKING PNEUMATIC TIRES.
(Application filed Apr. 8, 1897.)
(No Model.)
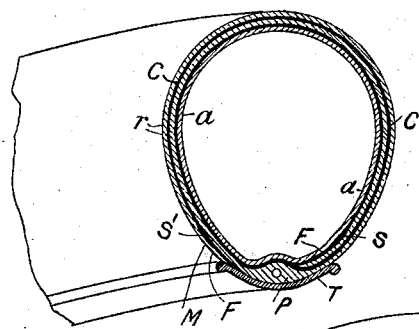
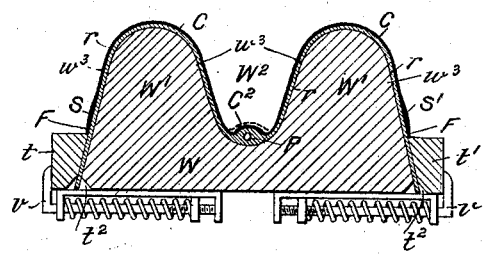
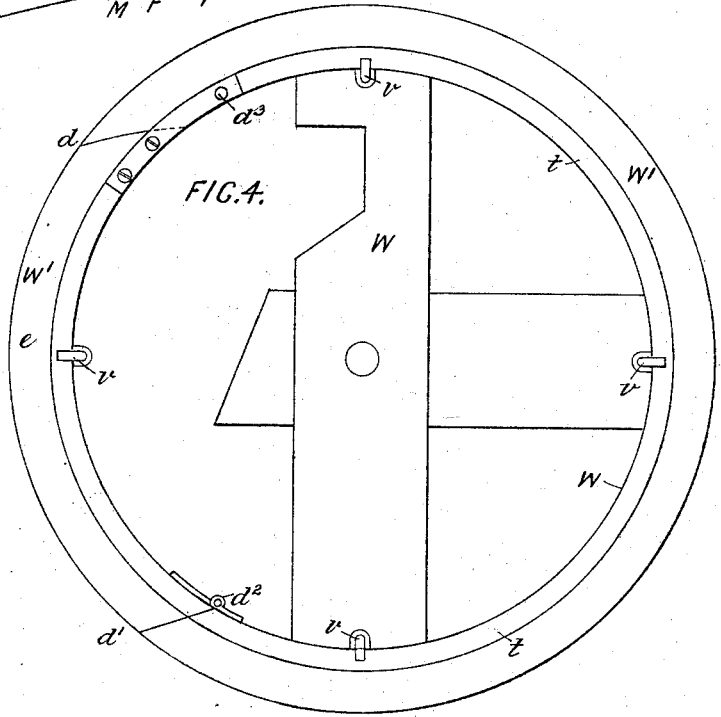
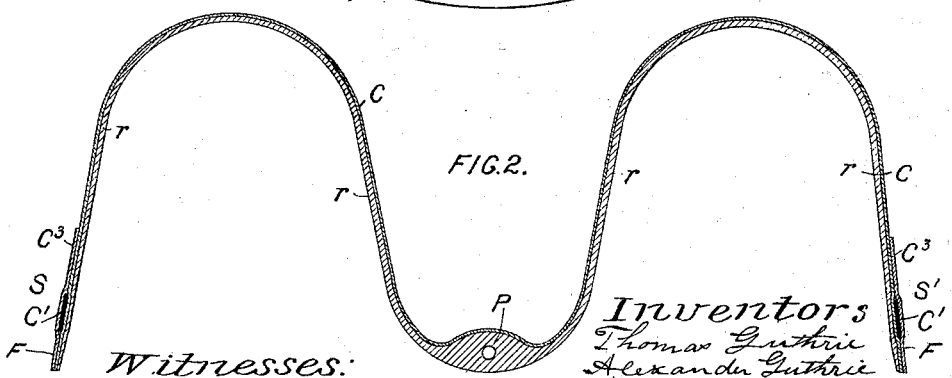

UNITED STATES PATENT OFFICE.

THOMAS GUTHRIE AND ALEXANDER GUTHRIE, OF SOUTH SHIELDS, ENGLAND.

APPARATUS FOR MAKING PNEUMATIC TIRES.

SPECIFICATION forming part of Letters Patent No. 607,991, dated July 26, 1898.

Application filed April 8, 1897. Serial No. 631,290. (No model.) Patented in England July 15, 1896, No. 15,669.

*To all whom it may concern:*

Be it known that we, THOMAS GUTHRIE and ALEXANDER GUTHRIE, subjects of the Queen of Great Britain and Ireland, and residents of 3 Thorney Terrace, South Shields, in the county of Durham, England, have invented certain new and useful Improvements in Pneumatic Tires and in the Method of and Apparatus for Constructing Same, (for part of which a patent has been obtained in Great Britain, No. 15,669, dated July 15, 1896,) of which the following is a specification.

Our invention relates to means for building pneumatic tires.

Hitherto in the construction of tires of an analogous type to that hereinafter described the result has generally been unsatisfactory as regards shape and security of attachment, and the object of these improvements is to remedy these defects and to so construct the tire that it may be more easily and readily attached to and detached from the rim when required without the aid of wires or molded sections either when inflated or deflated and in a manner enabling the use of an exceptionally light section or form of rim. These results are obtained by constructing or building on special apparatus the tire from the side which is eventually the exterior surface; or, in other words, the side of the tire next the mandrel in the process of making will be the running-surface when completed, and not only this, but the tire or tire-cover, as the case may be, will by the special mode of manufacture and on account of its width and special form of the molding-block employed take the form and have the desired locking action when in position, as hereinafter described.

In describing our invention we will refer to the accompanying drawings, of which—

Figure 1 is a cross-sectional and part elevational view of tire and rim; Fig. 2, an enlarged cross-sectional view showing approximately the form assumed by the tire when opened out. Fig. 3 is a cross-section of the mandrel or wheel upon which the tire is built, the latter being in position; and Fig. 4, an elevation of the mandrel.

We construct the tire in the form of a circular band $r$, usually of rubber backed with canvas C, having a thickened portion P, and of a width sufficient to encircle the air-tube $a$ or to overlap a sufficient distance to bring the outer edges thereof between the circumference due to the center line of the tire and the rim. This circular band when opened out and released, by reason of its special form and mode of manufacture, hereinafter described, takes a form more or less as shown in Fig. 2, the ends or outer parts S S' having a circumference about equal to the circumference of the inner or thickened part P. The band on either side of this thickened portion may be of uniform thickness, as shown, the rubber $r$ of the tire having a canvas backing or lining C throughout its length and width and being provided at its edges or at a part near its outer edges with an edging or strip of canvas cut on the straight, as shown at C', Fig. 2, or, equivalently, with cords or other means for the purpose of more or less strengthening the tire and for forming a definite circumferential marginal length at S S' less than the circumferential length measured along the center line of the tire.

To fit the tire, the circular band is laid upon and the central or thickened part P (see Fig. 1) fitted into the hollow of the rim T. The said part P is formed of less circumference than the rim, so as to be considerably stretched, thereby assisting to secure the tire to the rim. The inflation-tube $a$ (if used) is laid in and partly blown up. Then first one (it does not matter which) and then the other free side—say, first S and then S'—is lapped over the inflation-tube $a$, and having arranged them neatly in position the tire is blown up tight. The edges S S' being folded over one another and over the air-tube $a$ (if used) and their circumferential marginal length being between and of less circumference than the circumference due to the center line of the tire, the whole is securely held in position, even when deflated, by the self-locking action of the two sides. Consequently the tire is doubly secure when inflated, which tightly binds the lapped tire and air-tube together. When the tire is wholly or partly deflated, the air-tube (if used) of course collapses, but the tire or tire-cover by reason of its form and construction still has a secure hold upon the rim; but the sides S S' may be easily and readily unlapped and removed within their own circumference, owing to the absence of internal pressure, and there being no mechanical connections between the tire and rim the latter can be materially reduced in width and weight, and no special force being necessary to remove and replace the lapped parts the risk of damage to the inner tube is practically abolished.

It will be observed that there is a space M between the edges S S' of the tire and the edge of the rim T, and for uniformity of appearance, if so desired, a tapered flap formed by the double of the canvas or an extension of the rubber $r$, as shown at F, Figs. 1 and 3, may be employed, the edges of which may extend to the rim.

In Fig. 4 is shown a cross-section of the means or apparatus to be employed in building the tire, which consists of a mandrel or wheel W, of wood or any suitable material, having formed around its periphery two inverted-U-shaped ridges or projections W', suitably spaced apart, the connection being in the form of a curve of determined radius, foming a central U-shaped recess or trough $W^2$, and all the sides $W^3$ are somewhat tapered from the inner to the outer periphery of the wheel. Outside the edges the mandrel is formed with two removable rings or sections $t\ t'$, adapted to secure the material while the tire is in course of construction by means of adjustable spring-clips, such as $v\ v$, and having cut-away parts $t^2$ for adjusting the material upon the mandrel. The mandrel is adapted to be mounted and revolved and is divided at two convenient points, as at $d\ d'$, a hinge $d^2$ being preferably arranged at one point, so that the part $e$ can be turned into or over the other as the wheel collapses on the withdrawal of a temporary fastening, such as a pin $d^3$, and the arms or spokes are appropriately formed or cut away, as shown, to admit of such motion.

According to our method of building we place the endless rubber band $r$ over the wheel or mandrel W, pressing the thickened portion P thereof into the central trough $W^2$ and drawing the thinner parts $r$ over the side ridges, where they are temporarily secured by the clamping-rings $t\ t'$ and clips $v\ v$. We then arrange over the rubber the endless canvas band C, of width dependent on the strength required, and we prefer to fix by solution thereto a narrow canvas band, as shown dotted at $C^2$, (see Fig. 3,) to hold the canvas in position during building and to strengthen the tire. We next turn back the canvas from the rubber, preferably one ridge at a time, solution the rubber, and return the canvas and manipulate to secure satisfactory adhesion. The other ridge is next operated in like manner. We next solution the canvas already fixed and turn over the hanging piece at each ridge to meet in the central trough $W^2$ and manipulate adequately, the cord when used being inclosed in the turn of the canvas; or we may cut off the canvas strip C at the edge of the rubber $r$ and solution and reapply the cut-off portion or a portion of suitable width, as at $C^3$, to cover and secure the strip of canvas C', cut on the straight, the latter having been previously placed and secured by solution in accurate position around the tire by the assistance of temporary guiding-rings (not shown) placed upon the mandrel for the purpose. The tire is now complete, and after a sufficient time has elapsed for setting the mandrel is collapsed and the tire removed for attachment to the rim, as described.

The tire is applicable for use either with or without an inner air-tube.

What we claim as our invention, and desire to secure by Letters Patent, is—

1. In apparatus for use in building or constructing tires of the kind described, a wheel or mandrel of wood or suitable material having formed around its periphery two inverted-U-shaped ridges or projections suitably spaced apart and connected by a curve of determined radius forming a central U-shaped recess the sides being somewhat tapered from the inner toward the outer periphery of the wheel, and provided with removable side rings and clips substantially in the manner set forth.

2. A wheel or mandrel of wood for forming tires, having two inverted-U-shaped ridges or projections spaced apart and connected by a curve of a determined radius forming a central U-shaped recess.

In witness whereof we have hereunto set our hands in presence of two witnesses.

THOMAS GUTHRIE.
ALEXANDER GUTHRIE.

Witnesses:
A. B. GOLDSBROUGH,
THOMAS KINGHORN.